May 1, 1973 W. C. ROSS 3,730,794

METHOD OF PRODUCING A NOVEL COMPRESSIBLE ROLL

Filed Sept. 14, 1970

United States Patent Office 3,730,794
Patented May 1, 1973

3,730,794
METHOD OF PRODUCING A NOVEL
COMPRESSIBLE ROLL
William Campbell Ross, Winchester, Mass., assignor to
W. R. Grace & Co., Cambridge, Mass.
Continuation-in-part of application Ser. No. 725,577, Apr.
17, 1968, now Patent No. 3,568,286, which is a continuation-in-part of application Ser. No. 588,174, Oct.
20, 1966, now abandoned. This application Sept. 14,
1970, Ser. No. 71,801
Int. Cl. B29h 11/00
U.S. Cl. 156—112
19 Claims

ABSTRACT OF THE DISCLOSURE

A method of preparing novel products especially suitable as printing rolls is disclosed wherein elastomer-coated filaments (e.g. synthetic rubber coated glass filaments) are wound on a core at an angle to the core and apart from one another and are joined at the cross-over points by the elastomer. The filaments are wound in such a manner that void spaces are defined by the filaments resulting in a porous, compressible structure.

---

This application is a continuation-in-part of application, Ser. No. 725,577 filed Apr. 17, 1968, now U.S. Pat. No. 3,568,286 which is a continuation-in-part of application Ser. No. 588,174 filed Oct. 20, 1966, now abandoned.

This invention relates to a method of preparing a novel compressible product and more particularly to a filament winding process for producing a novel, resilient, volume-compressible roll especially suitable for use as a printing roll, vehicle tire, etc.

Compression rolls generally in use today both in printing and industrial applications are frequently used in conjunction with a non-resilient surface, generally a non-resilient roll although a plate is also used. In order to obtain the desired intimate contact with the material which passes between the two rolls, a force is applied to the combination. Therefore, it is necessary that one or both of the rolls be compressible to insure contact across the face of both rolls despite any variations in materials or equipment. Rubber, which is the most commonly used material for rolls, is however, not a truly compressible material. In the true sense of the word, a compresible material must be reducible in volume, that is, it must possess the ability to be forced into a space smaller than that it originally occupied. Rubber does not possess this property; rather, it is displaced under force and flows in a manner similar to liquids. When pressures are applied to rubber, the rubber moves away from the point of application of pressure in several directions causing distortion or deformation of the rubber without substantially changing its volume thereby assuming a shape different from the original shape prior to the application of the force. In high speed equipment employing such rolls, the lack of volume compressibility and dimensional stability results in a number of deficiencies, such as heat-build-up, generation of static electricity, increased wear, and speed variations through the nip.

A novel roll has now been found which is not subject to the prior art deficiencies and which is particularly useful in printing and other industrial applications.

The novel roll of the present invention comprises a porous layer of filamentary material as a compressible member wound on a substantially non-resilient core and bonded at the crossover points by an elastomeric binder material which substantially covers the filamentary material. The filamentary material is wound at an angle to the axis of the core in such a manner as to provide a porous member comprising a network of voids between adjacent filaments. The filamentary material is wound in such a manner so that there is no contact between adjacent filaments in the same layer. As a load is exerted on the roll during operation, the elastomeric binder material will flow onto the voids, and, as a result the roll will occupy a smaller space than it occupied under no load. The roll also possesses resistance to lateral distortion by virtue of the stabilization provide by the filamentary material. Thus the roll of the present invention is volume compressible because under a load it occupies a space smaller than that which it occupies with no load and it is dimensionally stable. In the roll of the present invention, there is substantially no movement under compression except in the direct line of the applied pressure. As stated above, a prior art rubber roll, for example, would not be volume compressible and would be subject to lateral movement or creep as well as other deficiencies. Because of the property of volume compressibility, the roll of the present invention is not subject to the aforementioned deficiencies.

In order that the invention may be more clearly understood, it will be described in conjunction with the attached drawings in which FIG. 1 is a diagramatic view of the roll with the portion of the surface cover removed;

Figure 1:
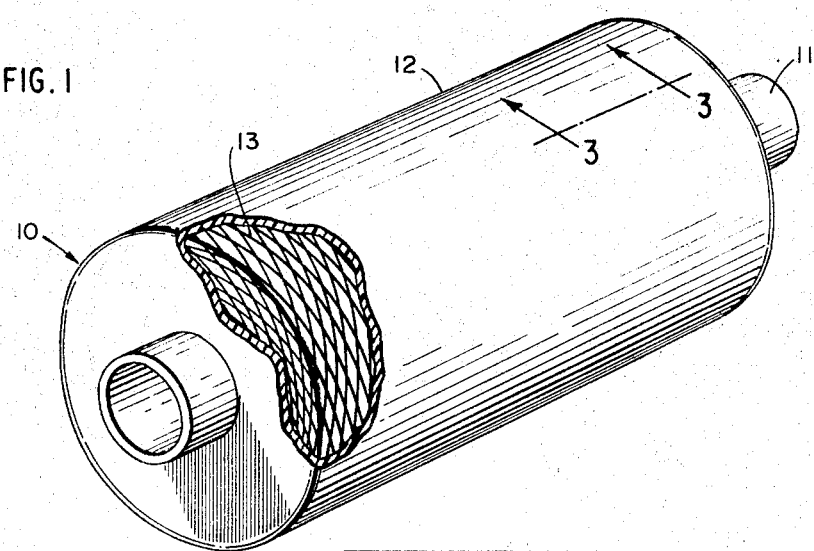

Referring now to the drawings, in FIG. 1, roll 10 is composed of non-resilient core 11 upon which rubber coated fibres 13 are wound in a predetermined pattern. The surface is covered with a surface coating 12.

Figure 2:
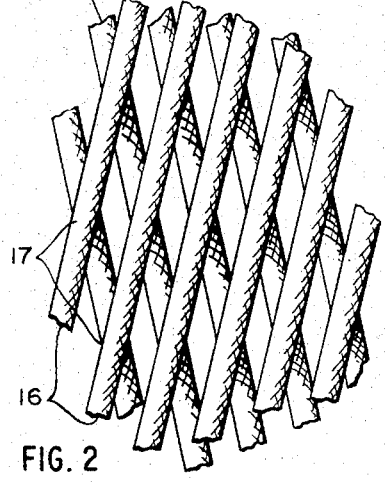
FIG. 2 is an enlarged diagramatic view showing two layers of filament windings.

FIG. 2 is an enlarged diagramatic view showing two layers of filament windings. Filaments 15 have been wound on a core at an angle to the core from right to left. Filament 16 represents the next layer wound from left to right at the same angle as filaments 15. Filaments 15 and 16 are bonded at their crossover points 17 by the elastomeric material.

Figure 3:
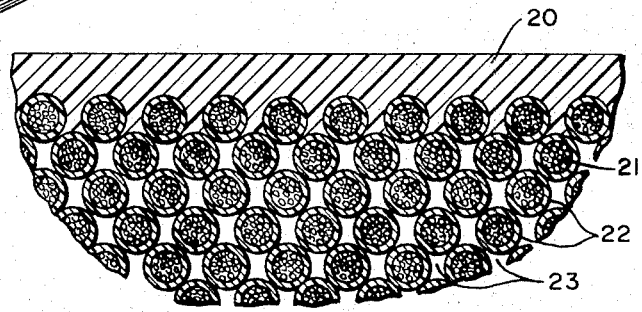
FIG. 3 is an enlarged diagramatic side elevation of a cross section of the roll of FIG. 1 taken along lines 3—3.
Figure 4:
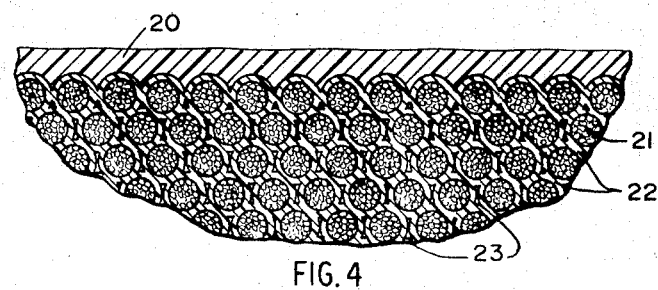
FIG. 4 is the cross section of FIG. 3 under compression.

FIG. 3 is an enlarged diagrammatic cross section of a portion of roll 10 taken on lines 3—3. Underlying surface coating 20 is a plurality of layers of cords made up of individual filaments 21 which are surrounded with elastomeric material flows upon compression. FIG. 4 shows the cross section of FIG. 3 in its compressed state wherein the elastomeric material 22 has been forced to flow into voids 23.

Figure 5:
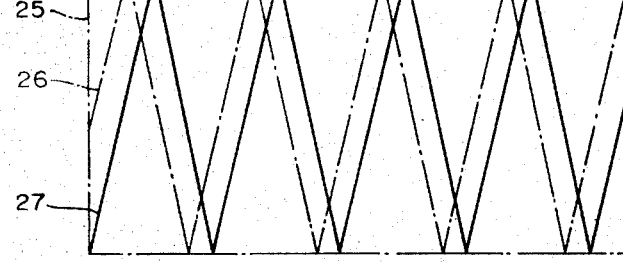
FIG. 5 is a schematic representation of two layers of filament windings.

In FIG. 5, solid line 27 represents a filament wound on a non-resilient core 25 in a predetermined angle from left to right. Broken line 26 represents the path taken by the same filament as it is wound from right to left returning to the left-hand edge of the core 25.

The rolls are prepared by winding filamentary material in a predetermined pattern on a non-resilient core. Each successive winding does not fall directly on the underlying parallel filament in the same layer; rather, it is displaced to provide the necessary void spaces and thus, adjacent filaments in the same layer do not contact each other. In one embodiment, the filament winding is started at one end of the core and wound at the desired angle across the core to the opposite end. The winding direction is then reversed and winding continued at the same angle back across the core making a criss-cross pattern with the underlayer. When the starting point is reached, the direction is again reversed, but care is taken to offset the upper of windings to avoid positioning it directly over the underlayer which is wound in the same direction. This procedure is continued until the desired number of windings is achieved.

Alternatively, one or more filaments may be applied to the core at the same time. For example, two filaments may be started, either at opposite ends of the core or at the center and wound on opposite directions at the same angle.

In one embodiment, the novel rolls of the present invention are prepared by applying the elastomeric binder material to a filament, e.g., by passing the filament and the binder material through a nozzle and winding the resulting coated filament on a non-resilient core in the manner described above, spacing said filament to provide a predetermined amount of voids between the filaments. If desired, an adhesive is employed to secure the filaments to the core. Depending upon the binder material employed, a partial curing step for the binder material prior to the winding operation may be necessary in order to prevent the flow of the binder material into the voids as the roll is formed. After the winding of the filament is complete, curing of the binder is accomplished and, if desired a surface layer of a suitable surface coating material applied.

Alternatively, uncoated filaments may be wound directly on a core in the manner described above. As the filaments are deposited upon the core and over the underlying layers of filaments, elastomeric binder material is applied, e.g., by spraying, to provide the filament coating and the binding action at the filament crossover points. In preparing rolls according to this alternative embodiment, care must be taken to control the solids of the applied binder material and the speed at which the fibers are wound in order to prevent filling the void spaces with binder.

The void volume of the rolls and the thickness of the filament layers may vary over a relatively wide range depending upon the particular properties desired in the roll. For example, for a compression roll in leterpress applications, relatively low compression is desired, e.g., about 5 mils, and a thickness of about 30 mils of .0050 inch diameter filaments is satisfactory. For a high compression textile roll, approximately half an inch of filamentary windings of .0100 of .0200 inch diameter filaments would be employed. In the majority of applications, the above 30 mil figure may be taken as a minimum thickness and the half inch figure, as a maximum. It should be understood that the above figures are illustrative and may be varied according to the particular filament used.

The number of layers of filamentary material depends upon the pattern of windings employed, the diameter of the filament, the tension under which the filament is wound and the angle of the windings. The angle of winding preferably ranges from substantially perpendicular to the axis of the roll to an angle of 45° to the axis of the roll. The term "substantially perpendicular" as used herein is intended to refer to an angle deviating from a 90° angle to the axis of the roll and is intended to exclude a 90° angle. If the filaments were wound at an angle perpendicular to the axis of the roll, i.e., a 90° angle, then successive windings would lie directly on top of each other and the windings would not progress across the face of the roll. It is critical that the filaments be placed at such an angle so that there is no contact between adjacent filaments. The minimum angle, therefore, must be such that in one revolution of the roll, the filament advances along the roll a distance greater than the diameter of the coated filament. Thus the minimum void size is a function of the filament diameter. The specific angle selected are also dependent upon the circumference of the drum as well as the void volume desired.

The closer the filaments are spaced to each other, the smaller the voids will be and the less the compression. In a calender roll, for example, where the deflection desired frequently is approximately 3 to 5 mils, a relatively thin layer of filamentary windings with a relatively small void volume would be employed. In a calender roll where a relatively large deflection is desired, e.g., about 30 to 50 mis, a relatively thick layer of filamentary windings with a relatively large void volume would be employed.

In an alternative embodiment, the filamentary material is wound at one angle for several layers and then the angle is changed. Thus a roll may comprise winding at different angles, but the angle change must not occur within a layer. The angle must remain constant throughout the layer.

In a preferred embodiment, the void volume is not less than 10 percent. However, a void volume of less than 10 percent may be employed for low compression operations. The upper limit of the void volume is determined by the unevenness of the pressure pattern which can be tolerated for the particular employment of the roll. When the fibers are wound in such a manner as to provide a relatively large void volume, the size of the thus-formed voids or gaps result in variations in compression across the area of the roll.

The volume of the elastomeric binder material on the filaments is preferably equal to the void volume. Preferably no more than an amount of binder material equal to the voids is employed. At least sufficient binder material should be present to permit flow of the binder into the voids thus obtaining the desired deflection in the roll. In a particularly preferred embodiment, at least about 75% by weight of elastomeric binder based on the weight of filament is employed.

Preferably a smooth, abrasion-resistant coating is applied to the surface of the roll. This coating serves to eliminate any pattern of the filaments which may print through on material passing over the roller and also protects the filaments from damage or wear. The particular surface coating may be selected depending upon the ultimate use of the roll and may be applied in several forms. As examples of suitable materials for the surface coatings, mention may be made of synthetic rubber compositions such as butadiene/acrylonitrile, butadiene/styrene and butadiene/styrene/acrylonitrile copolymers, vinyl polymers such as polyvinyl chloride and polyvinylidene chloride, epoxy resins and polyurethanes. The coatings may be applied from a solution or a latex by means of a tape or unsupported film or shrinkable film. In applications where a smooth, polished surface is not necessary, the surface may comprise a tight winding of filaments across the entire face of the roll.

The following non-limiting examples illustrate the preparation of a roll of the present invention.

Example I

To a roll core 6 inches long and 2.1 inches in diameter was applied Fiberglas yarn (ECG 150 3/0, average diameter 10 mils, twist 0, denier 900, breaking strength 16). The yarn was coated with nitrile rubber in an amount of 13 percent by weight of rubber based on the weight of the yarn. A Leesona 959 take-up machine was employed to wind approximately 3600 yards of yarn onto the core at an angle of 45°. Winding was carried out in such a manner that successive parallel layers of yarn did not fall directly on top of each other. The distance between adjacent parallel yarns was approximately one thirty-second of an inch. The thickness of the filamentary layer was about ½ inch. The roll was then given an additional treatment with a 10 percent nitrile rubber solution to provide additional bond strength to the yarn. A top coating of a polyurethane film 20 mils in thickness was applied to the roll. The finished roll consisted of 50 percent by volume of coated yarns and 50 percent by volume of air spaces.

The terms "filament" and "filamentary material" as used herein are intended to refer to an individual continuous fiber, a plurality of fibers formed into a continuous strand, cords, yarns, and threads. Preferably, the filamentary material employed in the present invention comprises a strand which has been treated by means known to the art to minimize any abrasion on the strand during fabrication of the roll, e.g. by a polymeric coating such as polyvinyl chloride, plastisol, or neoprene.

The filaments employed in the present invention include both natural and synthetic fibers such as glass, modacrylic (Dynel), polyester (Dacron), polyethylene, polypropylene, polyvinylidene chloride, fluorocarbon, rayon, nylon, acrylic, cotton and wool. The particular fiber employed in the roll is selected with the end use of the roll in mind. For example, glass is the preferred filamentary material because of its substantially complete elastic recovery at substantially all loads and temperatures. Where relatively low loads are to be employed or if elastic recovery is not a major factor in the use of the roll, other materials may be employed. For example, Dynel, which has 100 percent elastic recovery at 2 percent elongation could be selected for relatively low load operations.

In a particularly preferred embodiment, continuous filament glass yarn is employed. The continuous filament yarn is prepared by twisting and/or plying a number of Fiberglas fibers. A polymeric coating is applied to the yarn to make the glass non-friable.

Any elastomeric binder material for use in the present invention. As examples of such elastomers, mention may be made of synthetic rubbers such as nitrile rubber, neoprene, natural rubber and butadiene/styrene rubbers. The binders are preferably employed in the form of solvent solutions. However, aqueous latices are also employed to apply the elastomer to the filament. The binder can be coated on the filamentary material by passing the filament through a bath of binder solution or latex. Alternatively, the elastomeric binder can be applied by extruding a coating of the binder upon the filament using conventional extrusion techniques.

Small amounts of conventional additives, for example, vulcanizing agents, antioxidants, adhesion promoters, plasticizers, softeners, organic accelerators, etc. can be incorporated in the elastomeric binder.

The filament should be substantially covered by the binder or have a sufficient uniformity of pattern of deposited binder to give a uniform compression profile under load.

To provide, for example, extra cushion, the elastomeric binder material can be caused to foam utilizing conventional methods. Any of the well-known foaming agents such as 4,4'-oxybisbenzenesulfonyl hydrazide, can be employed in the elastomeric binder to assure foaming of the elastomer. The extent to which the elastomer is foamed can be varied. For instance, foaming may be conducted to the extent that the spaces between the filaments in the wound roll are substantially filled with cellular elastomer, the filaments being connected by a network of elastomer-elastomer bonds. In such a case, the voids in the cellular elastomeric binder permit volume-compression of the material and the elastomer-elastomer bonds in the cellular network provide a high degree of cushion to the roll. Foaming to a lesser extent provides a roll wherein the spaces defined by the wound filaments are not entirely filled with wound cellular elastomer and the filaments are covered with a thin layer of the foamed elastomer which likewise provides cushion to the finished roll. The following is a non-limiting example of the preparation of a roll prepared according to the invention wherein the elastomeric binder is foamed:

EXAMPLE II

To a roll core 78 inches long and 4.55 inches in diameter was wound Fiberglas yarn (ECG 150-3/0 at a rate of 125 r.p.m. and an angle of 70° using a McClean-Anderson (Model W-L) filament winder. The space between adjacent parallel filaments was about 0.1 inch. Prior to winding, three coats of an elastomeric binder were applied to the yarn with drying in between each coat, the yarn after the final coating having a diameter of 0.07 inch.

The elastomeric binder used had the following composition:

| | |
|---|---|
| Neoprene rubber | 100 |
| Zinc oxide | 5 |
| Magnesium oxide | 4 |
| Antioxidant | 2 |
| Phenolic resin | 15 |
| 4,4' oxybisbenzenesulfonyl hydrazide | 0.8 |
| Coumarone-indene resin | 10 |
| Aliphatic hydrocarbon | 15 |
| Vulcanizing agent | 0.8 |

The tension of the yarn during winding was maintained at a minimum, approximately 200 grams. The yarn was wound to a diameter of 6.19 inches, the amount of elastomeric binder (solids) deposited being 10,906 gms. and the amount of glass yarn wound being 2060 gms. A thin coating of the binder material was applied over the thus wound roll and the roll cured for 4 hours at 250° F. There resulted in a roll wherein the spaces formed by the initial winding of the roll with the coated filament were substantially filled with foamed elastomeric binder, the requisite void spaces for volume compressibility being provided by the cellular network of the foamed elastomer.

In another embodiment, instead of applying the filamentary material directly to a non-resilient core, an additional compressible material may be interposed between the core and between the porous layer of filamentary material. As an example of such material, mention may be made of polymeric sponge materials such as neoprene, urethane, and natural rubber foams.

The cores on which the filaments are wound can be steel, rubber, plaster, etc. The filament would structure can be employed with the core or the core removed after the filament winding step is complete. The cured elastomer-filament mass can simply be slipped off of the core or separated from the core by dissolving the core with a substance which is not a solvent for the filament or the elastomeric binder. A collapsible core can also be employed.

The nonresilient core can be perforated to permit escape of air upon compression of the roll. In this manner the roll is cooled during high speed operation of the roll. In a particularly preferred embodiment the nonresilient core comprises a hollow perforated cylinder.

Although the invention has been described primarily in terms of a roll, it should be understood that the present invention can also be employed in sheet form wherever a compressible sheet material is desired. Such a sheet material could be prepared by taking a roll within the scope of the present invention, cutting it along a line parallel to the axis of the roll and unwinding the porous filamentary layer from the nonresilient core. The thus-produced sheet material can then be used, for example, as a compressible lithographic blanket or letterpress packing.

The rolls of the present invention are employed in letterpress and offset printing applications, in finishing and glazing textiles, in calendering operations, as laminating rolls, and other applications where a compressible roll is desired. For instance, a product suitable for use as a vehicle tire can be made by directly winding the filamentary material in accordance with the invention upon a conventional vehicle tire rim and coating the wound structure before or after curing with an abrasion-resistant polymeric coating such as any of the well-known rubber tread compounds and then curing the tread compound and the binder on the filaments if not already cured. Alternatively, the cured wound structure can be removed from the core in a manner as described above, for instance, simply slipped off the mandrel, and inserted into a conventional vehicle tire carcass. Vehicle tires made in any of the foregoing manners are compressible and dimensionally stable and have the very desirable characteristic of being blowout proof. The following is a detailed example of one method of preparing such a tire.

EXAMPLE III

Figure 6:
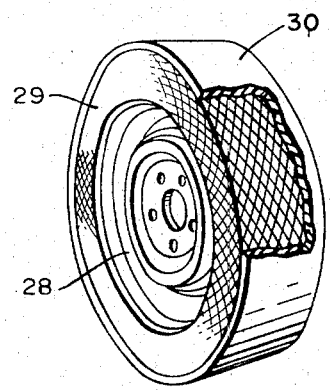
FIG. 6 is a diagramatic view of an embodiment of the roll of the invention suitable for use as a vehicle tire with a portion of the surface covering removed.

To a conventional 15 inch diameter automobile tire rim, 28 in FIG. 6, was applied Fiberglas yarn (E.C.G. 75/5/3) which had previously been coated with a GRS type synthetic rubber tire tread compound. The glass yarn was coated by passing the yarn through a laboratory Brabender extruder having a crosshead die. The temperature of the extruder was 200° F. The inside nozzle of the extruder had a diameter of 0.038 inch and the outside a diameter of 0.120 inch. Five pounds of rubber for each pound of glass yarn was applied.

The innermost recess of the rim was filled with rubber to provide a flat surface upon which to wind. The coated yarn was then applied to the flat recess of the rim by winding the yarn circumferentially about the horizontal axis of the rim according to the manner of the invention using a McLean-Anderson Filament W–L winding machine. A porous compressible body of successive layers of the coated, wound filament 3½ inches high was built-up on the rim. The coated filaments in each of the successive layers were spaced from one another and wound at an angle to the horizontal axis of the rim as shown in FIG. 6. The winding apparatus was pre-adjusted such that the angle of winding in any one layer of filaments was constant. A one-inch wide ribbon of the tire tread compound, 1/16 of an inch in thickness, was then extruded over the surface of the windings until a 1/8 inch thickness was obtained to provide covering 30 after curing. The resulting product was then rotated in an oven for 6½ hours at 265° F. to cure the rubber and to provide a compressible product ideally suited for use as an automobile tire.

Since certain changes and modifications may be made in the above-described invention without departing from the scope of the invention, it is intended that all matter contained in the above description or shown in the accompanying drawing should be interpreted as illustrative and not in a limiting sense.

It is claimed:

1. The method of producing a compressible product, said method comprising the steps of providing a substantially non-resilient core having a horizontal axis; winding, in a plurality of successive layers, an elastomeric binder-coated filamentary material about said horizontal axis at an angle to said axis, said winding being conducted such that the coated filaments in each of said layers are spaced from one another and are disposed at a constant angle to said axis and filaments in a layer are at an angle to the filaments in an adjacent layer; and bonding said elastomeric coated filaments in adjacent layers to one another at the point where one coated filament crosses over another coated filament, said bonding being effected in a manner such that consolidation of the wound filamentary mass does not take place in order that a compressible porous network of wound bonded filamentary material having void spaces therein be obtained.

2. A method as defined in claim 1 wherein the compressible mass is removed from said core after said winding.

3. A method as defined in claim 1 wherein said filamentary material is glass yarn.

4. A method as defined in claim 1 wherein said binder is a synthetic rubber.

5. A method as defined in claim 1 wherein said coated, wound bonded filaments are in contact only at said crossover points.

6. A method as defined in claim 1 wherein said filamentary material is wound on said core at an angle between substantially perpendicular and 45° to said axis.

7. A method as defined in claim 1 wherein at least about 75 percent by weight, based on the weight of said filamentary material, of said binder is employed.

8. The method of producing a compressible product, said method comprising the steps of (a) providing a substantially non-resilient core having a horizontal axis; (b) winding in a plurality of successive layers; an elastomeric binder coated filamentary material about said horizontal axis at an angle to said axis, said winding being conducted such that the coated filaments in each of said layers are spaced from one another and are disposed at a constant angle to said axis and filaments in a layer are at an angle to the filaments in an adjacent layer; (c) bonding the elastomeric binder-coated filaments in adjacent layers to one another at the points where one coated filament crosses another coated filament, said bonding being effected in a manner such that consolidation of the wound filamentary mass does not take place in order that a compressible porous network of wound filamentary material having void spaces therein be obtained; and (d) covering the surface of said wound, bonded filamentary material with an abrasion-resistant polymeric material.

9. A method as defined in claim 8 wherein said elastomeric binder is an uncured synthetic rubber composition and said bonding is effected by curing said rubber.

10. The method of claim 1 wherein the void volume of the porous network of wound-bonded filamentary mass is not less than 10%.

11. The method of producing a compressible printing roll, said method comprising the steps of providing a substantially non-resilient core having a horizontal axis; coating a filamentary material with a curable elastomeric binder and winding said coated filamentary material in a plurality of successive layers about said horizontal axis at an angle to said axis and in a manner such that the coated filaments in each of said layers are spaced from one another and are disposed at a constant angle to said axis and the coated filaments in adjacent layers are at an angle to one another; thereafter curing said elastomeric binder to bond the coated filaments to one another at the points where one coated filament crosses another coated filament said curing being effected in a manner such that consolidation of the wound filamentary mass does not take place in order that a compressible porous network of wound bonded filamentary material having void spaces therein be obtained, and covering said porous network with a layer of abrasion-resistant polymeric material.

12. A method as defined in claim 11 wherein said coating with elastomeric binder is effected by passing said filamentary material through a solvent solution of said binder.

13. A method as defined in claim 12 wherein said binder is partially cured prior to said winding.

14. The method of producing a compressible vehicle tire, said method comprising the steps of (a) providing a substantially non-resilient core having a horizontal axis; (b) coating a filamentary material with a curable synthetic rubber composition and winding said coated filamentary material in a plurality of successive layers about said horizontal axis of said core at an angle to said axis and in a manner such that the coated filaments in each of said layers are spaced from another and are disposed at a constant angle to said axis, and the coated filaments in adjacent successive layers are at an angle to one another; (c) and thereafter curing said synthetic rubber composition to bond said coated filaments at the points where one coated filament crosses another coated filament to provide a compressible, porous network of wound, bonded filamentary material having void spaces therein.

15. The method of claim 14 wherein said coating is effected by extruding said rubber composition on said filamentary material.

16. The method of claim 13 wherein said non-resilient core comprises a cylindrical vehicle tire rim.

17. The method of producing a compressible vehicle tire comprising the steps of (a) providing a cylindrical vehicle tire rim having a horizontal axis, (b) extruding a coating of uncured synthetic rubber composition on a strand of filamentary material and winding said coated filamentary material in a plurality of successive layers about said horizontal axis of said rim at an angle to said axis, said winding being conducted such that the coated filaments in each of said layers are spaced from one another and are disposed at a constant angle to said axis, and coated fialments and a layer are at an angle to the coated filaments in an adjacent layer; (c) covering the surface of said plurality of layers of coated wound filamentary material with a layer of uncured synthetic rubber tire tread composition; and (d) curing said synthetic rubber composition by exposing said composition to heat, said curing being effected in a manner such that consolidation of the wound filamentary mass does not take place in order that a compressible porous network of wound bonded filamentary material having void spaces therein its obtained.

18. A method as defined in claim 17 wherein said filamentary material is glass yarn.

19. A method as defined in claim 17 wherein said synthetic rubber composition contains a butadiene-styrene copolymer.

References Cited

UNITED STATES PATENTS

| 2,844,502 | 7/1958 | Paxton | 156—338 X |
|---|---|---|---|
| 2,979,431 | 4/1961 | Perrault | 156—244 |
| 3,090,716 | 5/1963 | Stevens | 156—338 X |
| 3,531,349 | 9/1970 | Whipple | 156—175 X |
| 3,579,422 | 5/1971 | Minick et al. | 156—169 X |
| 2,152,612 | 3/1939 | Tischer | 156—172 X |
| 2,980,158 | 4/1961 | Meyer | 156—175 |

FOREIGN PATENTS

| 111,712 | 12/1917 | Great Britain | 156—175 |
|---|---|---|---|

CARL D. QUARFORTH, Primary Examiner

L. E. LEHMANN, Assistant Examiner

U.S. Cl. X.R.

29—132; 152—311; 156—175, 244, 334; 161—157